United States Patent
Sura et al.

(10) Patent No.: US 7,384,210 B2
(45) Date of Patent: Jun. 10, 2008

(54) METHOD AND APPARATUS FOR MOUNTING A COMPONENT IN AN INFORMATION HANDLING SYSTEM

(75) Inventors: Lisa Maria Sura, Pflugerville, TX (US); Jeffrey James DeMoss, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 92 days.

(21) Appl. No.: 10/925,131

(22) Filed: Aug. 24, 2004

(65) Prior Publication Data

US 2006/0045616 A1    Mar. 2, 2006

(51) Int. Cl.
*F16B 19/00* (2006.01)
*F16B 5/00* (2006.01)

(52) U.S. Cl. ............... 403/168; 403/408.1; 411/510

(58) Field of Classification Search ............ 403/408.1, 403/167, 168, 353; 411/508–510, 104, 903; 24/458; 165/80.3, 122; 361/694, 695
See application file for complete search history.

(56) References Cited

U.S. PATENT DOCUMENTS

| | | | |
|---|---|---|---|
| 4,176,428 A * | 12/1979 | Kimura | 24/326 |
| 4,807,718 A | 2/1989 | Lotz | |
| 4,987,656 A * | 1/1991 | Sato | 24/297 |
| 5,316,423 A * | 5/1994 | Kin | 411/510 |
| 5,507,610 A * | 4/1996 | Benedetti et al. | 411/339 |
| 5,647,713 A * | 7/1997 | Ge et al. | 411/509 |
| 5,975,820 A * | 11/1999 | Kirchen | 411/339 |
| 6,322,382 B1 * | 11/2001 | Viallet | 439/248 |
| 6,351,380 B1 * | 2/2002 | Curlee et al. | 361/695 |
| 6,457,217 B2 * | 10/2002 | Yoshii et al. | 24/297 |
| 6,894,897 B1 * | 5/2005 | Nagurny et al. | 361/695 |
| 2002/0051338 A1 * | 5/2002 | Jiang et al. | 361/685 |
| 2005/0191123 A1 * | 9/2005 | Wertz et al. | 403/353 |

* cited by examiner

*Primary Examiner*—Daniel P. Stodola
*Assistant Examiner*—Joshua T Kennedy
(74) *Attorney, Agent, or Firm*—Haynes and Boone, LLP

(57) ABSTRACT

A mounting apparatus comprises an elongated damping member including a component coupler positioned along the length thereof, the damping member operable to damp vibrations from a modular component. A rigid mounting member is coupled to the damping member adjacent the component coupler, the rigid mounting member operable to secure the modular component to a chassis.

9 Claims, 10 Drawing Sheets

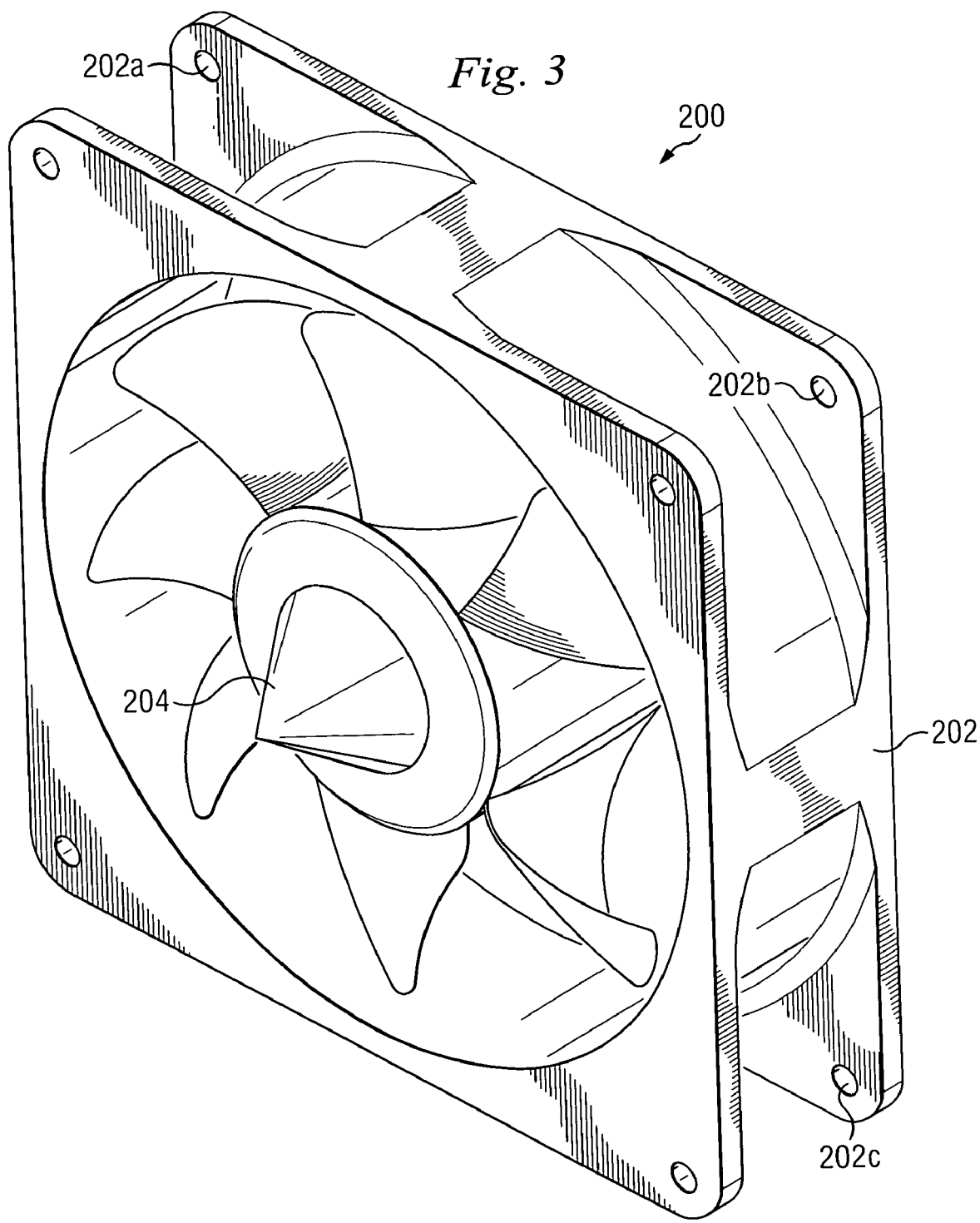

METHOD AND APPARATUS FOR MOUNTING A COMPONENT IN AN INFORMATION HANDLING SYSTEM

BACKGROUND

The present disclosure relates generally to information handling systems, and more particularly to a method and apparatus for mounting a component in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include modular components coupled to the system. These components may be mounted to the system chassis and can include vibration sources, which can raise acoustical issues. In order to meet the acoustic performance requirements for the system while keeping cost at a minimum, the modular components are typically mounted directly to the system chassis with one-piece, elastomeric fasteners. These elastomeric fasteners must provide acoustic isolation while structurally supporting the modular component.

As modular components get larger, these elastomeric fasteners cannot adequately support the components weight during shock or vibration when they are installed directly in the system chassis. For example, a metal chassis can abrade the elastomeric material during shock or vibration, causing the fastener to wear prematurely.

Accordingly, it would be desirable to provide an improved method and apparatus for mounting a component in an information handling system absent the disadvantages found in the prior methods discussed above.

SUMMARY

According to one embodiment, a mounting apparatus is provided that includes an elongated damping member including a component coupler positioned along the length thereof, and a rigid mounting member coupled to the damping member adjacent the component coupler, the rigid mounting member operable to secure to a chassis.

A principal advantage of this embodiment is that the mounting apparatus may provide adequate support for modular components when installed in the system chassis, while the rigid mounting member abates degradation of the apparatus due to issues such as abrasion during shock or vibration.

BRIEF DESCRIPTION OF THE DRAWINGS

FIG. 3 is a perspective view illustrating an embodiment of a modular component used with the mounting apparatus of FIG. 2

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
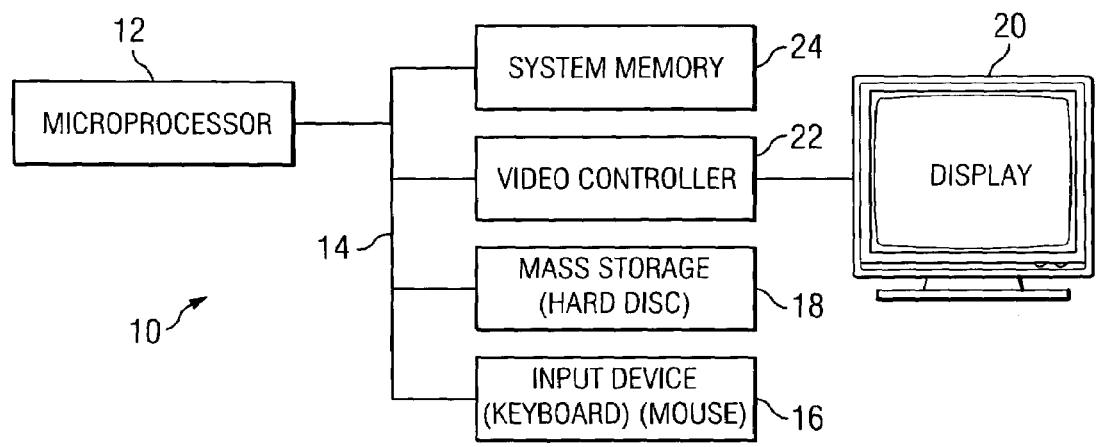
FIG. 1 is a schematic view illustrating an embodiment of an information handling system.

In one embodiment, information handling system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
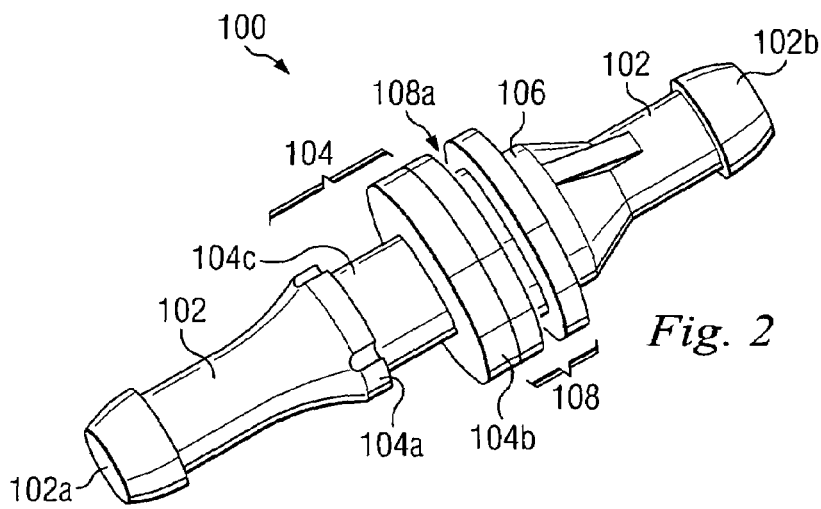
FIG. 2 is a perspective view illustrating an embodiment of a mounting apparatus.
Figure 5:
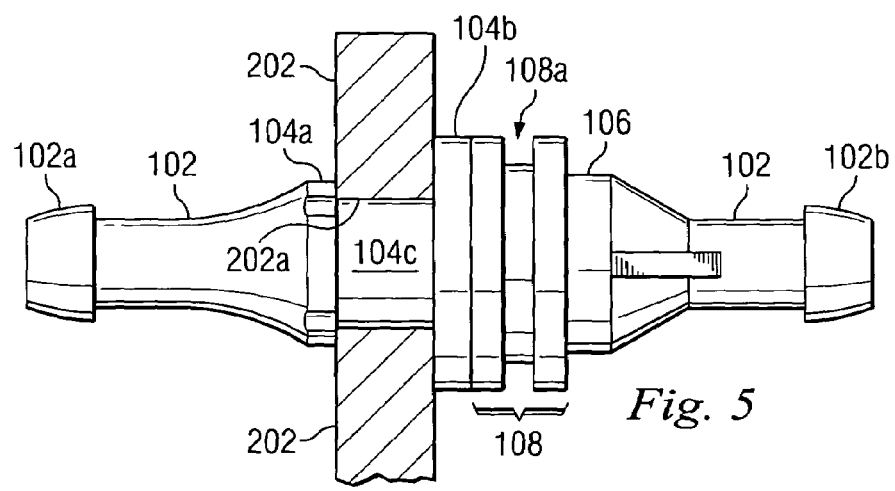
FIG. 5 is a partial cross sectional side view illustrating an embodiment of the mounting apparatus of FIG. 2 coupled to the modular component of FIG. 3.

Referring now to FIG. 2, a mounting apparatus 100 includes an elongated damping member 102 including a front end 102a and a rear end 102b opposite the front end 102a. In an exemplary embodiment, the damping member 102 includes an elastomeric material operable to damp vibrations. A component coupler 104 is positioned along the length of the damping member 102 and includes a plurality of component securing rings 104a and 104b defining an annular channel 104c between them, the annular channel running about the circumference of the damping member 102. A securing ring 106 is positioned on an opposite side of securing ring 104b from securing ring 104a. A rigid mounting member 108 is positioned between securing rings 104b and 106 and includes an annular channel 108a. In an exemplary embodiment, the rigid mounting member 108 includes a hard plastic material. In an exemplary embodiment, the rigid mounting member 108 may be a separate ring which is coupled to the damping member 102 by pulling the damping member 102 though the ring until the rigid mounting member is positioned between the securing rings 104b and 106. In an exemplary embodiment, the rigid mounting member 108 and the damping member 102 may be co-molded.

Referring now to FIG. 3, a modular component 200 includes a component chassis 202 with a plurality of apertures 202a, 202b, 202c, and 202d (not shown) formed therein. In an exemplary embodiment, apertures 202a and 202c are spaced apart at opposite corners of the component 200, and apertures 202b and 202d are spaced apart at opposite corners of component 200 not occupied by apertures 202a and 202c. In an exemplary embodiment, the modular component 200 includes a vibration source 204 such as, for example, a fan.

Figure 4:
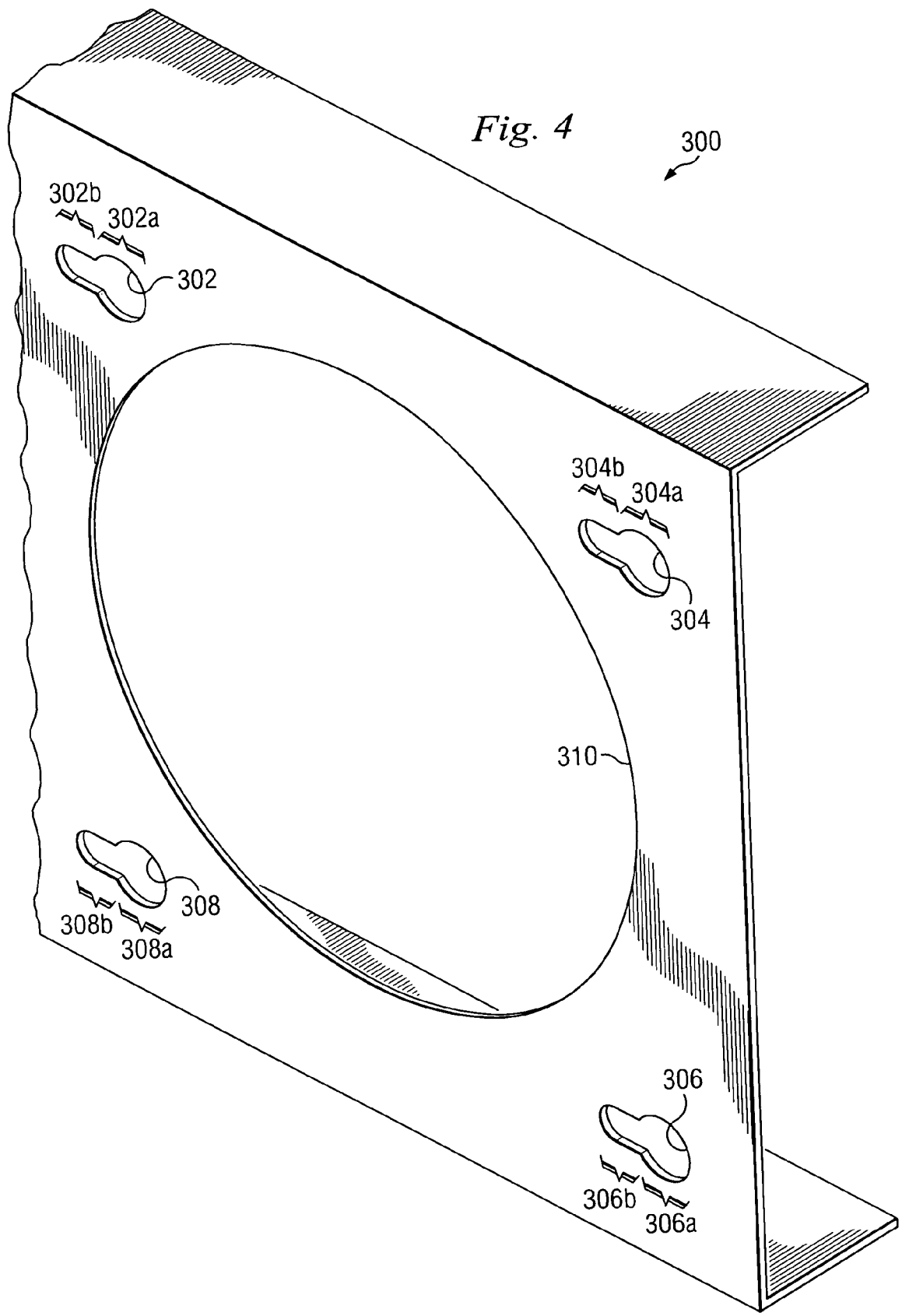
FIG. 4 is a perspective view illustrating an embodiment of a system chassis used with the mounting apparatus of FIG. 2 and the modular component of FIG. 3.
Figure 6:
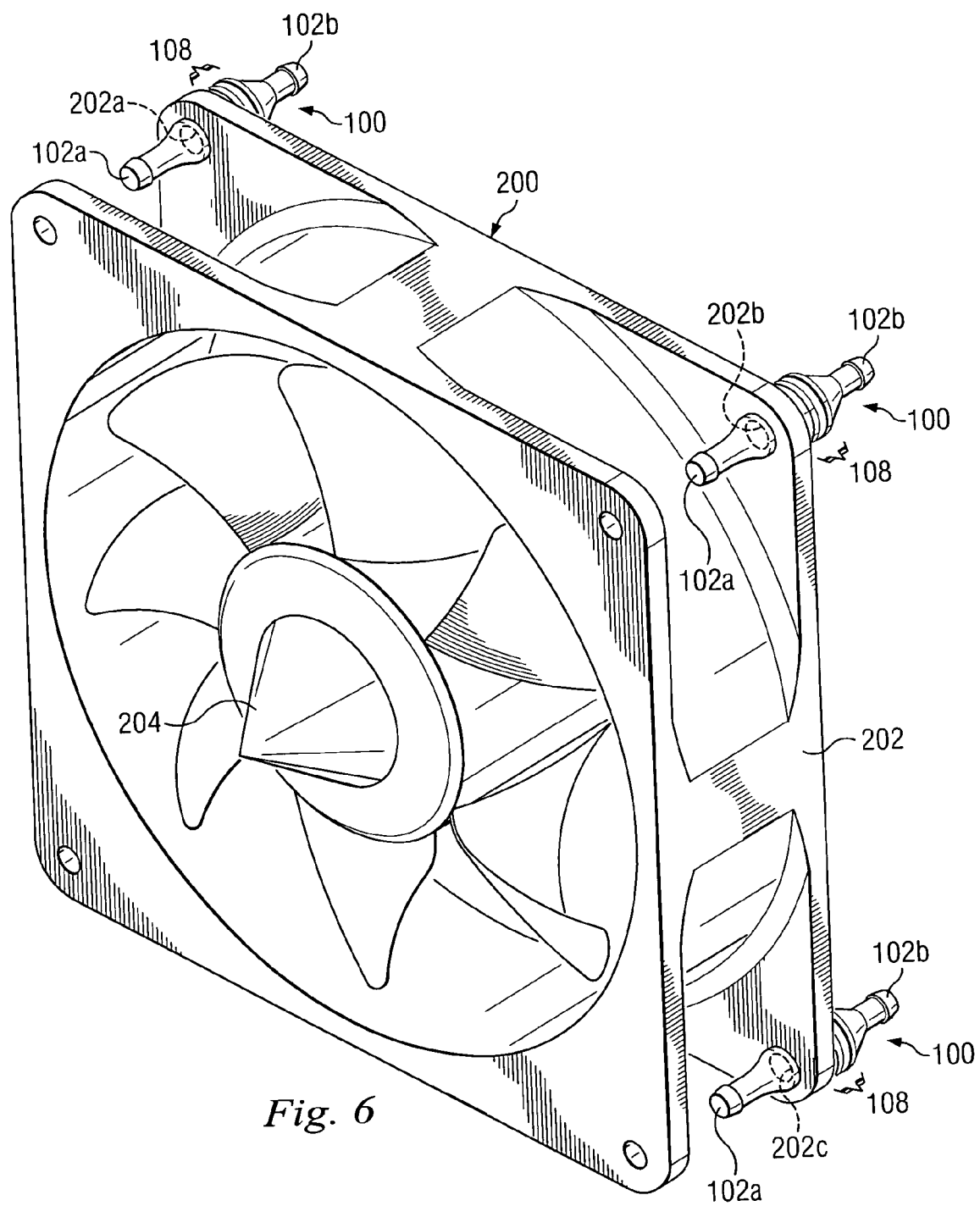
FIG. 6 is a perspective view illustrating an embodiment of a plurality of the mounting apparatus of FIG. 2 coupled to the modular component of FIG. 3.
Figure 7:
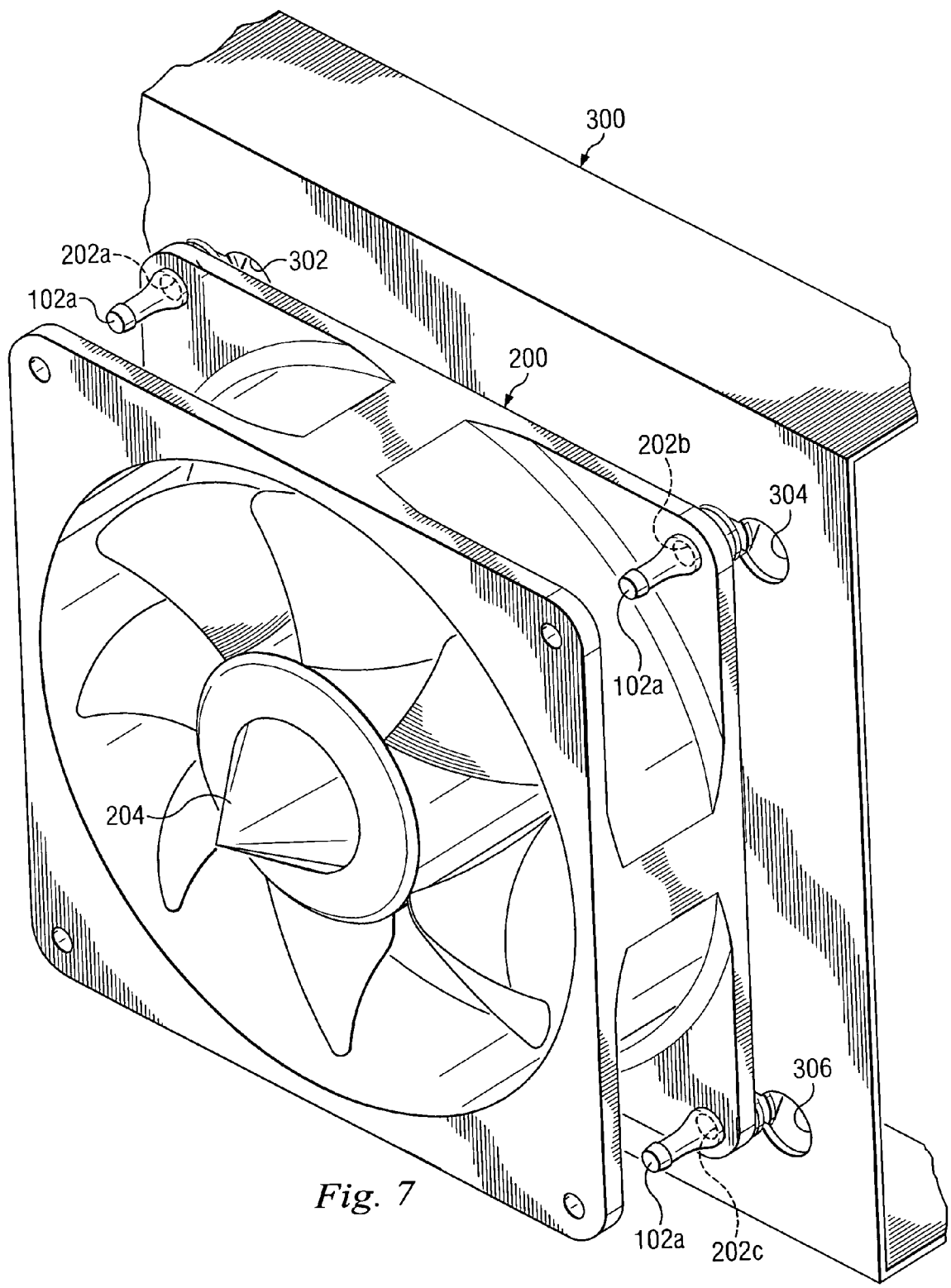
FIG. 7 is a perspective view illustrating the mounting apparatus and modular component of FIG. 6 coupled to the system chassis of FIG. 4.
Figure 8:
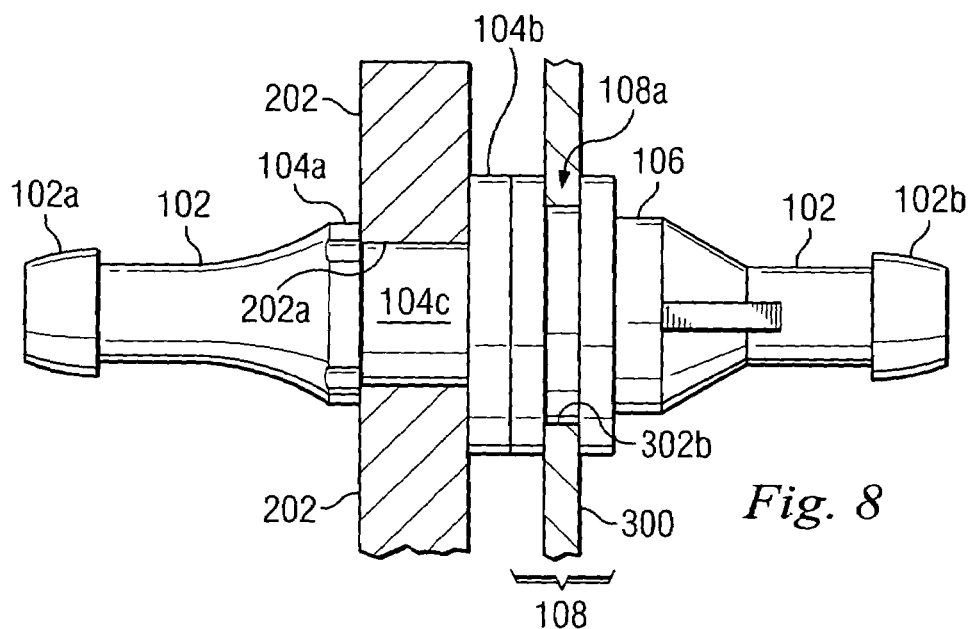
FIG. 8 is a partial cross sectional side view illustrating an embodiment of the mounting apparatus and modular component of FIG. 5 coupled to the system chassis of FIG. 4.

Referring now to FIG. 4, a system chassis 300 includes a plurality of mounting apertures 302, 304, 306, and 308 formed therein. Mounting aperture 302 includes a circular portion 302a and a channel portion 302b extending from the circular portion 302a. Mounting apertures 304, 306, and 308 are substantially similar to mounting aperture 302 and including respective circular portions 304a, 306a, and 308a and respective channel portions 304b, 306b, and 308b. In an exemplary embodiment, a component hole 310 is defined by the system chassis 300, positioned between the mounting apertures 302, 304, 306, and 308, and may be used, for example, to allow air flow through a fan coupled to the system chassis 300.

Referring now to FIGS. 2, 3, 5, and 6, in assembly operation, a mounting apparatus 100 is coupled to the modular component 200 by placing front end 102a of damping member 102 in aperture 202a of component chassis 202. Damping member 102 may then be pulled through aperture 202a until component chassis 202 is positioned in annular channel 104c of component coupler 104, with securing rings 104a and 104b on either side of the component chassis. In an exemplary embodiment, the damping member 102 includes an elastomeric material which is operable to compress and reduce the diameter of securing ring 104a to fit through aperture 202a. In an exemplary embodiment, additional mounting apparatus 100 may be coupled to the modular component 200 by placing the mounting apparatus 100 in apertures 202b, 202c, and 202d (not shown) in the manner described above with respect to aperture 202a.

Referring now to FIGS. 4, 5, 6, 7, and 8, in mounting operation, modular component 200 is brought towards system chassis 300 such that rear end 102b on mounting apparatus 100 in apertures 202a, 202b, 202c, and 202d are lined up with circular portions 302a, 304a, 306a, and 308a on mounting apertures 302, 304, 306, and 308, respectively. The modular component 200 is then brought towards the system chassis 300 until the rigid mounting member 108 on mounting apparatus 100 in apertures 202a, 202b, 202c, and 202d are situated in circular portions 302a, 304a, 306a, and 308a on mounting apertures 302, 304, 306, and 308, respectively. Channel portions 302b, 304b, 306b, and 308b are then lined up with annular channel 108a on mounting apparatus 100 in apertures 202a, 202b, 202c, and 202d, and the modular component 200 is translated such that the mounting apparatus 100 in apertures 202a, 202b, 202c, and 202d are positioned in channel portions 302b, 304b, 306b, and 308b, respectively, with the system chassis 300 situated in the annular channel 108a on the mounting apparatus 100 in apertures 202a, 202b, 202c, and 202d.

Figure 9:
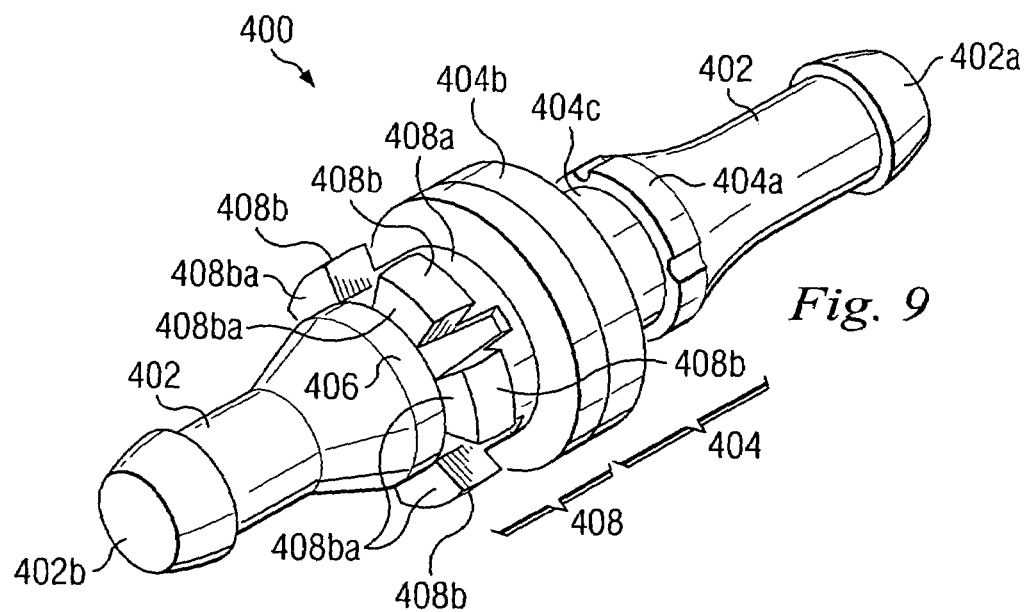
FIG. 9 is a perspective view illustrating an embodiment of a mounting apparatus.

Referring now to FIG. 9, in an alternative embodiment, a mounting apparatus 400 includes an elongated damping member 402 including a front end 402a and a rear end 402b opposite the front end 402a. In an exemplary embodiment, the damping member 402 includes an elastomeric material operable to damp vibrations. A component coupler 404 is positioned along the length of the damping member 402 and includes a plurality of component securing rings 404a and 404b defining an annular channel 404c between them, the annular channel running about the circumference of the damping member 402. A securing ring 406 is positioned on an opposite side of securing ring 404b from securing ring 404a. A rigid mounting member 408 is positioned between securing rings 404b and 406 and includes an annual channel 408a and a plurality of securing tabs 408b with beveled surfaces 408ba. In an exemplary embodiment, the rigid mounting member 408 includes a hard plastic material. In an exemplary embodiment, the rigid mounting member 408 may be a separate ring which is coupled to the damping member 402 by pulling the damping member 402 through the ring until the rigid mounting member is positioned between the securing rings 404b and 406. In an exemplary embodiment, the rigid mounting member 408 and the damping member 402 may be co-molded.

Figure 10:
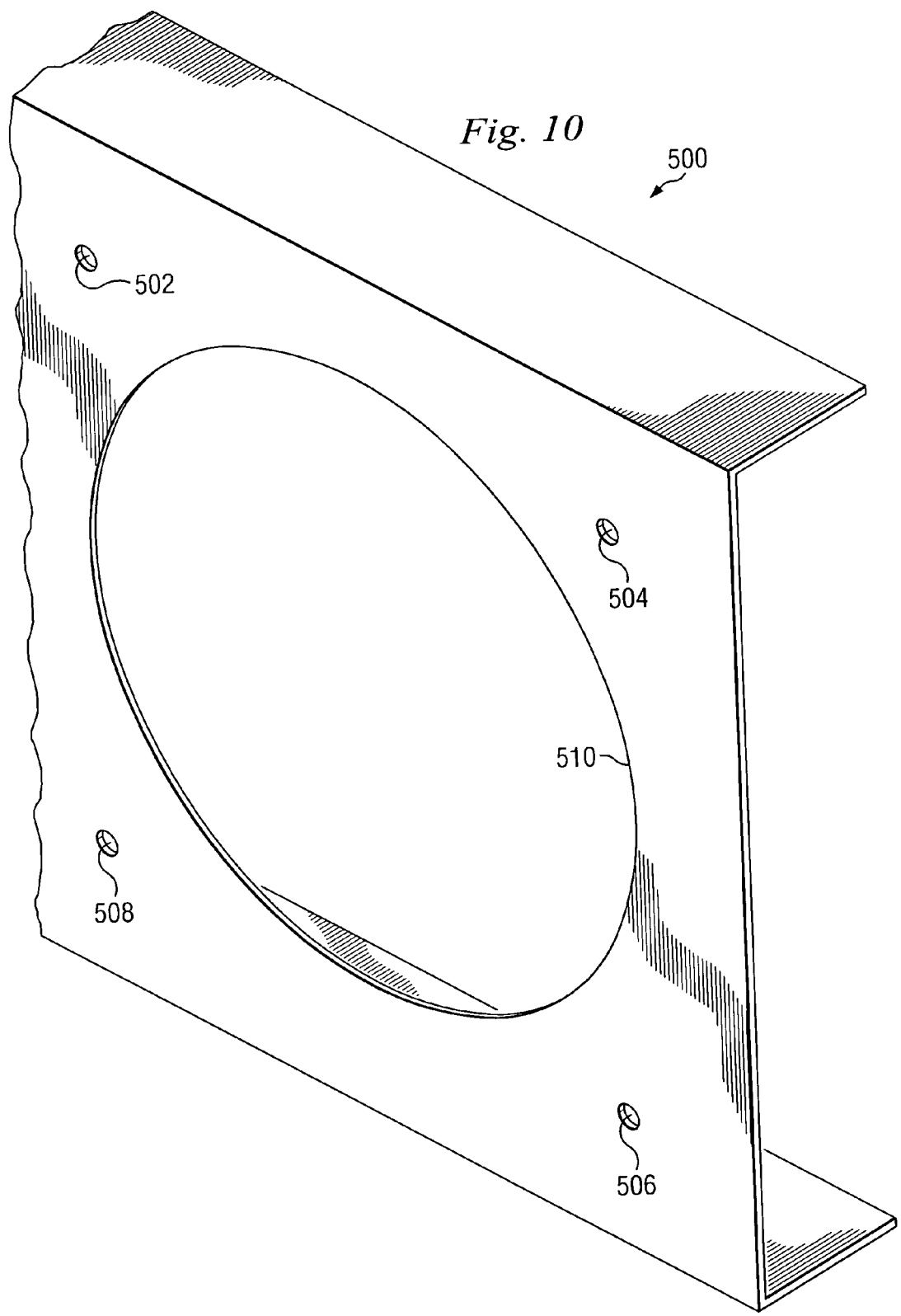
FIG. 10 is a perspective view illustrating an embodiment of a system chassis used with the mounting apparatus of FIG. 9 and the modular component of FIG. 3.
Figure 11:
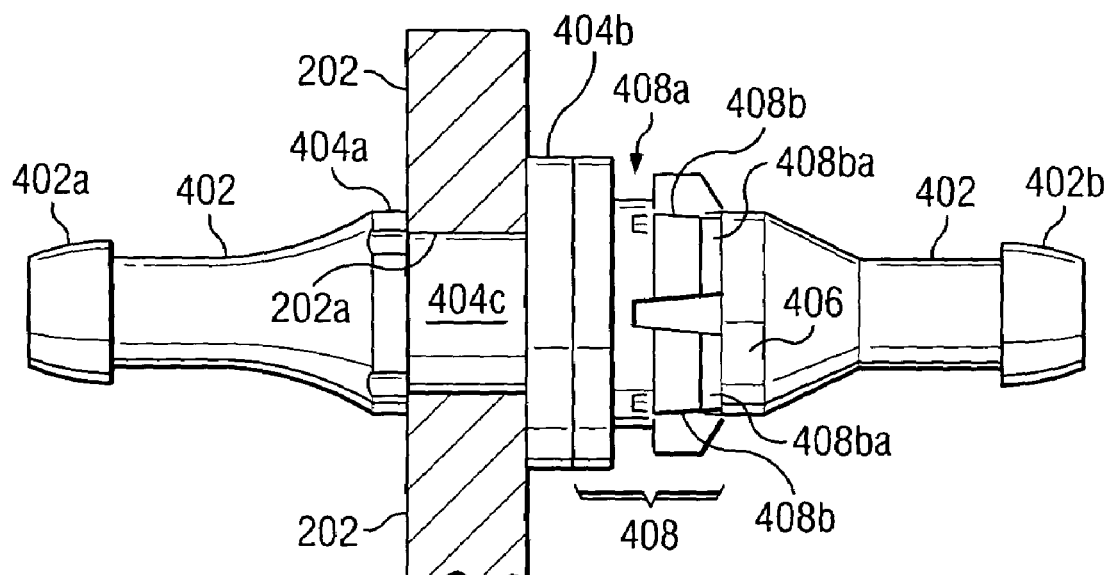
FIG. 11 is a partial cross sectional side view illustrating an embodiment of the mounting apparatus of FIG. 9 coupled to the modular component of FIG. 3.
Figure 14:
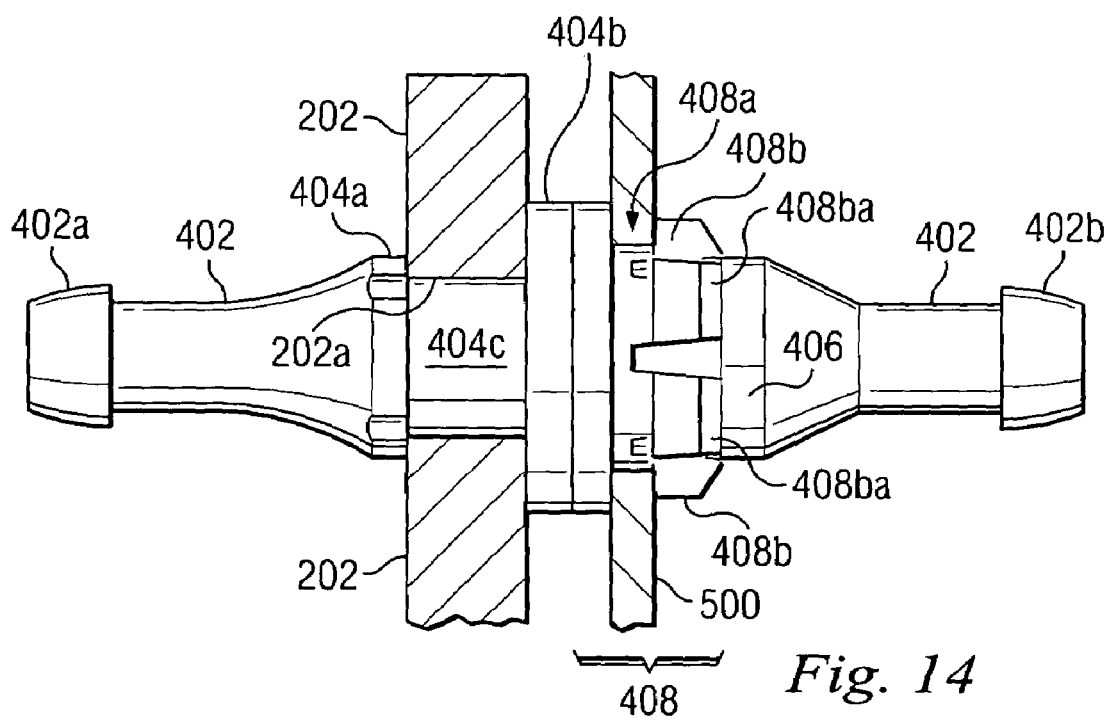
FIG. 14 is a partial cross sectional side view illustrating an embodiment of the mounting apparatus and modular component of FIG. 11 coupled to the system chassis of FIG. 10.
Figure 12:
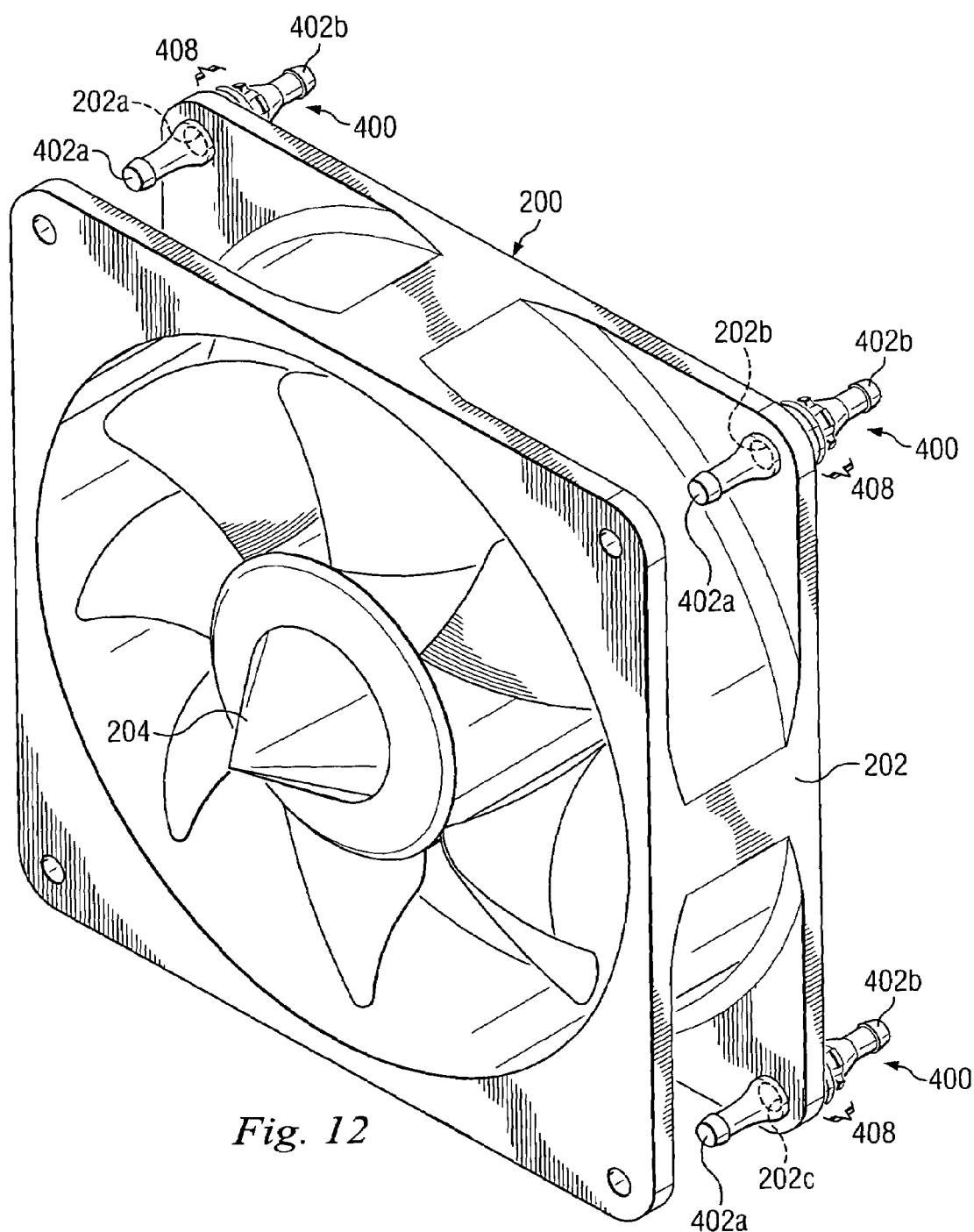
FIG. 12 is a perspective view illustrating an embodiment of a plurality of the mounting apparatus of FIG. 9 coupled to the modular component of FIG. 3.
Figure 13:
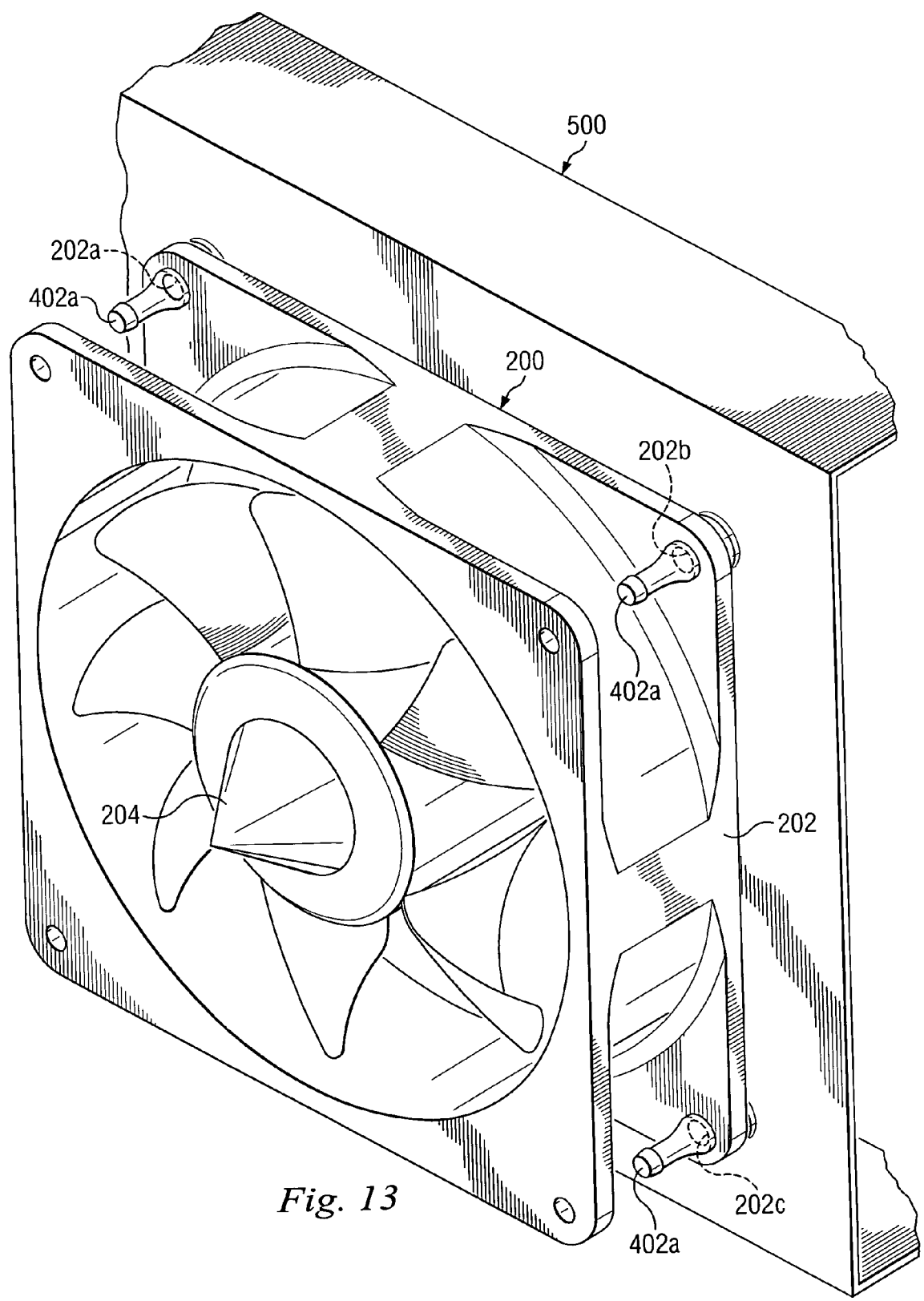
FIG. 13 is a perspective view illustrating the mounting apparatus and modular component of FIG. 12 coupled to the system chassis of FIG. 10.

Referring now to FIG. 10, a system chassis 500 includes a plurality of mounting apertures 502, 504, 506, and 508 formed therein. In an exemplary embodiment, a component hole 510 is defined by the system chassis 500, positioned between the mounting apertures 502, 504, 506, and 508, and may be used, for example, to allow air flow through a fan coupled to the system chassis 500.

Referring now to FIGS. 3, 9, 11, and 12, in assembly operation, a mounting apparatus 400 is coupled to the modular component 200 by placing front end 402a of damping member 402 in aperture 202a of component chassis 202. Damping member 402 may then be pulled through aperture 202a until component chassis 202 is positioned in annular channel 404c of component coupler 404, with securing rings 404a and 404b on either side of the component chassis. In an exemplary embodiment, the damping member 402 includes an elastomeric material which is operable to compress and reduce the diameter of securing ring 404a to fit through aperture 202a. In an exemplary embodiment, additional mounting apparatus 400 may be coupled to the modular component 200 by placing the mounting apparatus 400 in apertures 202b, 202c, and 202d (not shown) in the manner described above with respect to aperture 202a.

Referring now to FIGS. 10, 11, 12, 13, and 14, in mounting operation, modular component 200 is brought towards system chassis 500 such that rear end 402b on mounting apparatus 400 in apertures 202a, 202b, 202c, and 202d are lined up with mounting apertures 502, 504, 506, and 508, respectively. The modular component 200 is then brought towards the system chassis 500 until tabs 408b on rigid mounting member 408 in apertures 202a, 202b, 202c, and 202d engage mounting apertures 502, 504, 506, and 508, respectively. Modular component 200 may then be brought further towards system chassis 500, engaging beveled surfaces 408ba on rigid mounting members 408 with mounting apertures 502, 504, 506, and 508 and causing the securing tabs 408b to compress damping member 402, allowing chassis 500 into annular channel 408a on rigid mounting member 408 and securing mounting apparatus 400 in chassis 500.

It is understood that variations may be made in the foregoing without departing from the scope of the disclosed embodiments. Furthermore, the elements and teachings of the various illustrative embodiments may be combined in whole or in part some or all of the illustrated embodiments.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A mounting apparatus comprising:
    an elongated compressible damping member including a plurality of securing rings spaced therealong, first and second ones of the securing rings defining an annular groove;
    a rigid mounting member secured on the damping member within the annular groove defined by said first and second ones of the securing rings, the rigid member including an annular channel defined by a first planar side and a second side having a plurality of adjacent securing tabs projecting therefrom said securing tabs being radially inwardly movable to compress the damping member;
    a vibration producing member having a first aperture therein, the damping member being fitted to the vibration producing member so as to extend through the first aperture such that the second and a third one of the securing rings engage opposite sides of the vibration producing member; and
    a chassis adjacent the vibration producing member, the chassis having a second aperture, the securing tabs of rigid member being inwardly biased by engagement with the second aperture to compress the damping member to enable axial insertion through the second aperture such that the annular channel engages the interior walls of the second aperture in response to the securing tabs returning to a relaxed state.

2. The apparatus of claim 1 wherein the damping member includes an elastomeric material.

3. The apparatus of claim 1, wherein the rigid mounting member includes a rigid plastic material.

4. An information handling system comprising:
    a chassis;
    a microprocessor mounted in the chassis;
    a vibration producing member mounted in the chassis;
    means for mounting the vibration producing member in the chassis comprising:
        an elongated compressible damping member including a plurality of securing rings spaced therealong, first and second ones of the securing rings defining an annular groove;
        a rigid mounting member secured on the damping member within the annular groove defined by said first and second ones of the securing rings, the rigid member including an annular channel defined by a first planar side and a second side having a plurality of adjacent securing tabs projecting therefrom said securing tabs being radially inwardly movable to compress the damping member;
    the vibration producing member having a first aperture therein, the damping member being fitted to the vibration producing member so as to extend through the first aperture such that the second and a third one of the securing rings engage opposite sides of the vibration producing member; and
    the chassis adjacent the vibration producing member, the chassis having a second aperture, the securing tabs of rigid member being inwardly biased by engagement with the second aperture to compress the damping member to enable axial insertion through the second aperture such that the annular channel engages the interior walls of the second aperture in response to the securing tabs returning to a relaxed state.

5. The system of claim 4 wherein the damping member includes an elastomeric material.

6. The system of claim 4, wherein the rigid mounting member includes a rigid plastic material.

7. A method of mounting comprising:
    providing a vibration producing member with a first aperture;
    providing a chassis adjacent the vibration producing member, the chassis having a second aperture;
    providing an elongated compressible damping member including a plurality of securing rings spaced therealong, first and second ones of the securing rings defining an annular groove;
    securing a rigid mounting member on the damping member within the annular groove defined by said first and second ones of the securing rings, the rigid member including an annular channel defined by a first planar side and a second side having a plurality of adjacent securing tabs projecting therefrom said securing tabs being radially inwardly movable to compress the damping member; and fitting the damping member to the vibration producing member so as to extend through the first aperture such that the second and a third one of the securing rings engage opposite sides of the vibration producing member; and the securing tabs of rigid member being inwardly biased by engagement with the second aperture to compress the damping member to enable axial insertion through the second aperture such that the annular channel engages the interior walls of the second aperture in response to the securing tabs returning to a relaxed state.

8. The method of claim 7 wherein the damping member includes an elastomeric material.

9. The method of claim 7, wherein the rigid mounting member includes a rigid plastic material.

* * * * *